(12) United States Patent
Yamaguchi et al.

(10) Patent No.: US 11,407,279 B2
(45) Date of Patent: Aug. 9, 2022

(54) VEHICULAR AIR CONDITIONER

(71) Applicant: DENSO CORPORATION, Kariya (JP)

(72) Inventors: Akira Yamaguchi, Kariya (JP); Yoshiharu Endo, Kariya (JP); Tetsuya Takechi, Kariya (JP); Terukazu Higuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 62 days.

(21) Appl. No.: 16/692,753

(22) Filed: Nov. 22, 2019

(65) Prior Publication Data

US 2020/0086713 A1 Mar. 19, 2020

Related U.S. Application Data

(63) Continuation of application No. PCT/JP2018/017892, filed on May 9, 2018.

(30) Foreign Application Priority Data

May 30, 2017 (JP) .............................. JP2017-106942

(51) Int. Cl.
*B60H 1/00* (2006.01)
*B60H 1/22* (2006.01)
(Continued)

(52) U.S. Cl.
CPC ........... *B60H 1/00907* (2013.01); *B60H 1/00* (2013.01); *B60H 1/00428* (2013.01); *B60H 1/00785* (2013.01); *B60H 1/22* (2013.01); *B60H 1/3213* (2013.01); *B60H 3/024* (2013.01); *B60H 1/0005* (2013.01); *B60H 1/00735* (2013.01);
(Continued)

(58) Field of Classification Search
CPC .............. B60H 1/0005; B60H 1/00735; B60H 1/00921; B60H 1/034; B60H 1/3207
See application file for complete search history.

(56) References Cited

U.S. PATENT DOCUMENTS 9,523,518 B2 * 12/2016 Kitamura ........... B60H 1/00921
10,000,107 B2 * 6/2018 Hamamoto ........ B60H 1/00921
2011/0005255 A1 1/2011 Tanihata et al.

FOREIGN PATENT DOCUMENTS

JP H0732871 A 2/1995
JP 2011016446 A 1/2011
(Continued)

*Primary Examiner* — Leonard R Leo
(74) *Attorney, Agent, or Firm* — Harness, Dickey & Pierce, P.L.C.

(57) ABSTRACT

A vehicular air conditioner includes an air conditioning, a heater core, a heat pump cycle unit, a temperature detector, and a controller. The heat pump cycle unit includes a first inside heat exchanger disposed downstream of the heater core in a flow direction of a conditioning air, a second inside heat exchanger disposed upstream of the heater core in the flow direction of the conditioning air, and an outside heat exchanger. The temperature detector is configured to detect a passage air temperature, the passage air temperature being a temperature of the conditioning air that has passed through the heater core. The controller is configured to selectively switch a circuit layout of the heat pump cycle unit between a cooling circuit, a heating circuit, and a dehumidifying-heating circuit based on the passage air temperature.

4 Claims, 9 Drawing Sheets

(51) Int. Cl.
  *B60H 1/32*   (2006.01)
  *B60H 3/02*   (2006.01)
  *B60H 1/03*   (2006.01)

(52) U.S. Cl.
  CPC .......... *B60H 1/00921* (2013.01); *B60H 1/034* (2013.01); *B60H 1/3207* (2013.01); *B60H 2001/2246* (2013.01); *B60H 2001/3245* (2013.01); *B60H 2001/3255* (2013.01)

(56) References Cited

FOREIGN PATENT DOCUMENTS

| | | | | |
|---|---|---|---|---|
| JP | 2012201360 A | * | 10/2012 | ......... B60H 1/00921 |
| WO | WO-2016/203903 A1 | | 12/2016 | |

* cited by examiner

VEHICULAR AIR CONDITIONER

CROSS REFERENCE TO RELATED APPLICATION

The present application is a continuation application of International Patent Application No. PCT/JP2018/017892 filed on May 9, 2018, which designated the U.S. and claims the benefit of priority from Japanese Patent Application No. 2017-106942 filed on May 30, 2017. The entire disclosures of all of the above applications are incorporated herein by reference.

TECHNICAL FIELD

The present disclosure relates to a vehicular air conditioner.

BACKGROUND

General vehicular air conditioner includes a condenser and an evaporator placed in an air conditioning duct, and an outside heat exchanger placed outside the air conditioning duct. The condenser, the evaporator, and the outside heat exchanger are placed in a refrigerant circuit of a vapor compression refrigeration cycle unit. The operation mode of this air conditioner can be switched between a dehumidifying mode and a cooling or heating mode when a valve placed in the refrigerant circuit is switched to thereby switch the refrigerant circulation path. The air conditioner includes an ECU that switches the operation mode between the dehumidifying mode and the cooling or heating mode based on data that includes at least one of outside air temperature and target outlet temperature.

SUMMARY

Some recent vehicular air conditioners employ a heat pump cycle unit. Such vehicular air conditioners are capable of heating the conditioning air, which is to be emitted into the inside of the vehicle, when the temperature of the engine coolant is still low. Thus, this type of vehicular air conditioners has an advantage that the vehicle inside can be heated soon, for example, after the engine is started.

A vehicular air conditioner that employs a heat pump cycle unit can heat and dehumidify the inside of the vehicle by heating and dehumidifying, for example, outside air admitted into the air conditioning duct. The outside air temperature that can satisfy both heating and dehumidification of the conditioning air generally has a lower limit value due to the configuration of the heat pump cycle unit for use in this type of vehicular air conditioners. An outside air temperature equal to or lower than the lower limit value reduces heating and dehumidifying capability of the conditioning air, thus resulting in lowered heating and dehumidifying performance for the inside of the vehicle. This entails adverse effects such as significant reduction in anti-fog performance of the vehicle.

A vehicular air conditioner according to an aspect of the present disclosure includes, an air conditioning duct, a heater core, a heat pump cycle unit, a temperature detector, and a controller. The heater core is disposed in the air conditioning duct, and coolant for cooling an engine of a vehicle flows through the heater core. The heat pump cycle unit includes: a first inside heat exchanger disposed downstream of the heater core in a flow direction of a conditioning air, the first inside heat exchanger being configured to exchange heat between the conditioning air and a refrigerant; a second inside heat exchanger disposed upstream of the heater core in the flow direction of the conditioning air, the second inside heat exchanger being configured to exchange heat between the conditioning air and the refrigerant; and an outside heat exchanger configured to exchange heat between air outside the vehicle and the refrigerant. The temperature detector is configured to detect a passage air temperature, the passage air temperature being a temperature of the conditioning air that has passed through the heater core. The controller is configured to control the heat pump cycle unit. The controller is configured to selectively switch a circuit layout of the heat pump cycle unit between a cooling circuit, a heating circuit, and a dehumidifying-heating circuit based on the passage air temperature. The controller is configured to: switch the layout of the heat pump cycle unit to the cooling circuit by allowing the refrigerant to flow through the first inside heat exchanger, the second inside heat exchanger serving as an evaporator, and the outside heat exchanger serving as a condenser; switch the layout of the heat pump cycle unit to the heating circuit by allowing the refrigerant to flow through the first inside heat exchanger serving as a condenser, and the outside heat exchanger serving as an evaporator; and switch the layout of the heat pump cycle unit to the dehumidifying-heating circuit by allowing the refrigerant to flow through the first inside heat exchanger serving as a condenser, the second inside heat exchanger serving as an evaporator, and the outside heat exchanger.

EMBODIMENTS

Figure 1:
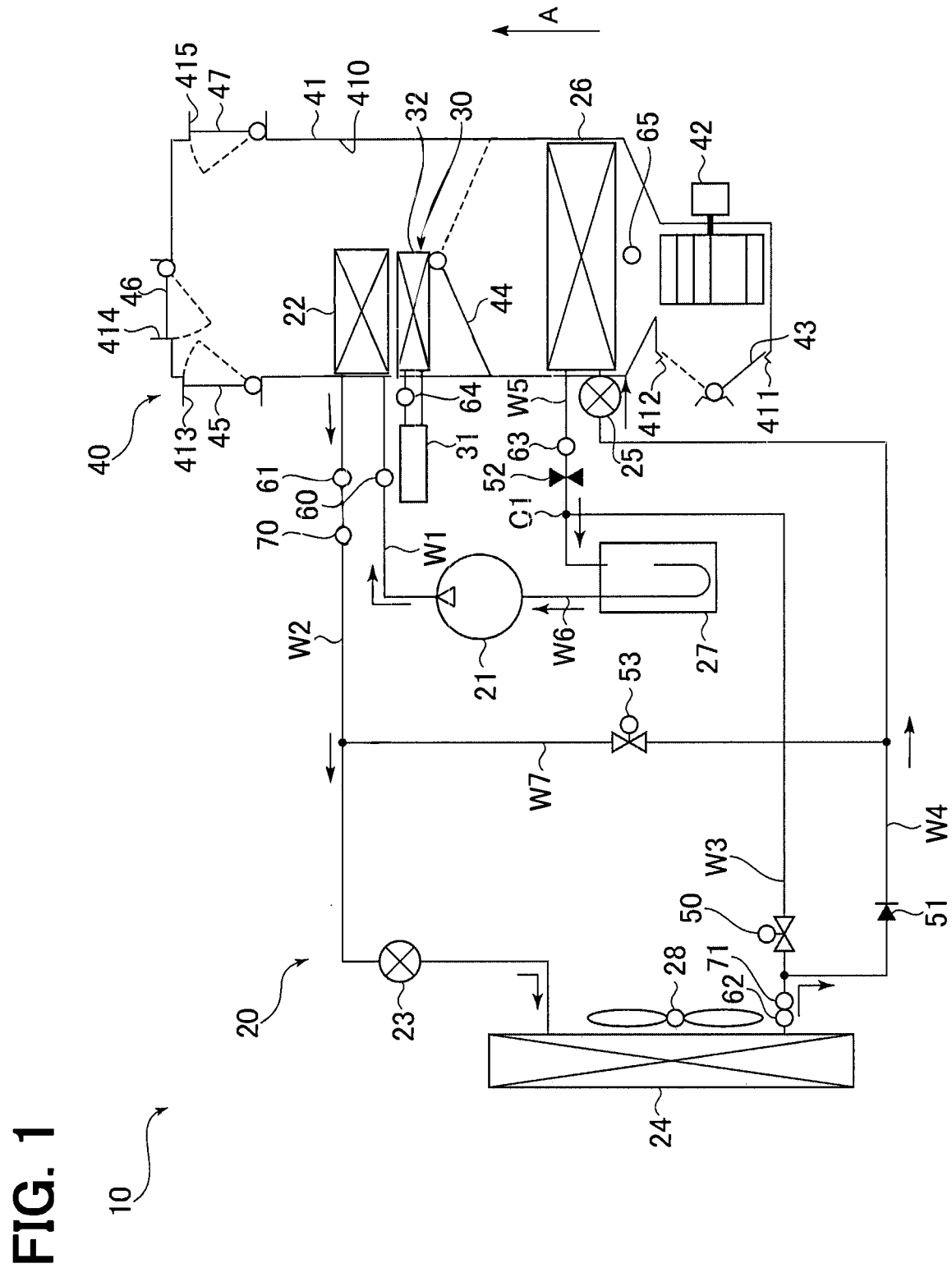
FIG. 1 is a block diagram illustrating a schematic configuration of a vehicular air conditioner according to a first embodiment.

Some embodiments of a vehicular air conditioner are described below with reference to the drawings. To facilitate understanding, identical constituent elements are designated with identical symbols in the drawings where possible with the duplicate description omitted.

First Embodiment

A first embodiment of the vehicular air conditioner is described. A vehicular air conditioner 10 according to the present embodiment in FIG. 1 is installable in, for example, a hybrid vehicle that is driven using power from an engine and an electric motor. The air conditioner 10 is operated in any of the following operation modes: a cooling mode where an inside of the vehicle is cooled; a heating mode where the inside of the vehicle is heated; and dehumidifying-heating mode where the inside of the vehicle is heated while dehumidified.

As illustrated in FIG. 1, the air conditioner 10 includes a heat pump cycle unit 20, a hot water heating unit 30, and an air conditioning unit 40. The heat pump cycle unit 20 cools or heats conditioning air for providing air conditioning in the inside of the vehicle. The hot water heating unit 30 heats conditioning air by using heat of a coolant for cooling an engine 31. The air conditioning unit 40 emits conditioning air having temperature regulated by the heat pump cycle unit 20 and the hot water heating unit 30 into the inside of the vehicle.

The heat pump cycle unit 20 includes a compressor 21, a first inside heat exchanger 22, a first expansion valve 23, an outside heat exchanger 24, a second expansion valve 25, a second inside heat exchanger 26, and an accumulator 27.

The compressor 21 is an electric compressor that is operated using electric power supplied by, for example, a battery installed in the vehicle. The compressor 21 admits refrigerant therein, compresses it adiabatically to produce heated refrigerant gas, and discharges the gas-phase refrigerant having increased temperature and increased pressure. The compressor 21 takes in and releases refrigerant to thereby circulate the refrigerant in the heat pump cycle unit 20. Refrigerant discharged by the compressor 21 flows through a refrigerant pathway W1 into the first inside heat exchanger 22.

The first inside heat exchanger 22 is placed in an air conditioning duct 41 of the air conditioning unit 40. The first inside heat exchanger 22 allows heat exchange between refrigerant flowing therethrough and conditioning air flowing through the air conditioning duct 41 to thereby permit the refrigerant to dissipate heat and heat up the conditioning air. The first inside heat exchanger 22 thus serves as a condenser. Refrigerant that has passed through the first inside heat exchanger 22 flows through a refrigerant pathway W2 into the outside heat exchanger 24.

The first expansion valve 23 is provided at a position in the refrigerant pathway W2. The first expansion valve 23 is an electric expansion valve having variable degree of opening. The first expansion valve 23 is placed in a fully open state when the air conditioner 10 is operated in the cooling mode. The first expansion valve 23 is caused to be open to a predefined degree smaller than that of the fully open state when the air conditioner 10 is operated in the heating mode or the dehumidifying-heating mode. When opened to a predefined degree, the first expansion valve 23 causes the refrigerant that has passed through the first inside heat exchanger 22 to expand to thereby produce refrigerant in a gas-liquid mixed state having decreased temperature and decreased pressure.

The outside heat exchanger 24 allows heat exchange between refrigerant flowing therethrough and outside air supplied by a fan 28. Outside air is air located outside the vehicle. The temperature of outside air may be hereinafter referred to in abbreviated form as "outside air temperature." When the temperature of refrigerant flowing therethrough is higher than the outside air temperature, the outside heat exchanger 24 causes the refrigerant to dissipate heat into outside air due to the heat of the outside air temperature. The outside heat exchanger 24 thus serves as a condenser. When the temperature of refrigerant flowing therethrough is lower than the outside air temperature, the outside heat exchanger 24 causes the refrigerant to absorb heat from the outside air. The outside heat exchanger 24 thus serves as an evaporator. Refrigerant that has passed through the outside heat exchanger 24 flows through one of a refrigerant pathway W3 and a refrigerant pathway W4. The refrigerant pathway W3 introduces refrigerant that has passed through the outside heat exchanger 24 into the accumulator 27. The refrigerant pathway W4 introduces refrigerant that has passed through the outside heat exchanger 24 into the second inside heat exchanger 26.

An electromagnetic valve 50 is placed in the refrigerant pathway W3. The electromagnetic valve 50 causes the refrigerant pathway W3 to be open or closed. The electromagnetic valve 50 in the open state allows refrigerant that has passed through the outside heat exchanger 24 to flow through the refrigerant pathway W3 into the accumulator 27. The electromagnetic valve 50 in the closed state allows refrigerant that has passed through the outside heat exchanger 24 to flow through the refrigerant pathway W4 into the second inside heat exchanger 26.

A check valve 51 and the second expansion valve 25 are placed in the refrigerant pathway W4. The check valve 51 allows refrigerant to flow from the outside heat exchanger 24 to the second inside heat exchanger 26 and prevents refrigerant from flowing in the reverse direction. The second expansion valve 25 is placed in the refrigerant pathway W4 immediately before a connection to the second inside heat exchanger 26. The second expansion valve 25 is an electric expansion valve having variable degree of opening. The second expansion valve 25 causes refrigerant that has passed through the outside heat exchanger 24 to expand and flow into the second inside heat exchanger 26.

The second inside heat exchanger 26 is placed in the air conditioning duct 41 of the air conditioning unit 40. The second inside heat exchanger 26 allows heat exchange between refrigerant flowing therethrough and conditioning air flowing through the air conditioning duct 41 to thereby permit the refrigerant to absorb heat from the conditioning air and evaporate. The second inside heat exchanger 26 thus serves as an evaporator. Conditioning air in the air conditioning duct 41 is cooled and dehumidified using latent heat of evaporation produced when the refrigerant evaporates. Refrigerant that has passed through the second inside heat exchanger 26 flows through a refrigerant pathway W5 and then into the refrigerant pathway W3 at an intermediate point to flow into the accumulator 27.

A pressure regulating valve 52 is placed upstream of a connection portion C1 of the refrigerant pathway W5 with the refrigerant pathway W3. The pressure regulating valve 52 maintains refrigerant at a predefined pressure at an outlet portion of the second inside heat exchanger 26.

The accumulator 27 separates refrigerant flowing in from the refrigerant pathway W3 into refrigerant in the gas phase and refrigerant in the liquid phase. When refrigerant in the liquid phase flows in the compressor 21, components of the compressor 21 may be damaged due to liquid compression.

To avoid such damage, the accumulator 27 supplies only refrigerant in the gas phase into the compressor 21 through a refrigerant pathway W6.

The heat pump cycle unit 20 includes a bypass W7 that connects the refrigerant pathway W2 and the refrigerant pathway W4. The bypass W7 connects a portion of the refrigerant pathway W2 located upstream of the first expansion valve 23 and a portion of the refrigerant pathway W4 located downstream of the check valve 51. The bypass W7 allows refrigerant that has passed through the first inside heat exchanger 22 to bypass the outside heat exchanger 24 and flow into the second inside heat exchanger 26.

An electromagnetic valve 53 is placed in the bypass W7. The electromagnetic valve 53 causes the bypass W7 to be open or closed. The electromagnetic valve 53 in the open state allows refrigerant that has passed through the first inside heat exchanger 22 to flow through the outside heat exchanger 24 or to bypass the outside heat exchanger 24 and flow through the second inside heat exchanger 26. The electromagnetic valve 53 in the closed state allows refrigerant that has passed through the first inside heat exchanger 22 to flow through the outside heat exchanger 24.

The hot water heating unit 30 includes a heater core 32 placed in the air conditioning duct 41 of the air conditioning unit 40. The coolant for cooling the engine 31 flows through the heater core 32. The heater core 32 allows heat exchange between the coolant flowing therethrough and conditioning air flowing through the air conditioning duct 41 to thereby heat up the conditioning air.

The air conditioning unit 40 includes the air conditioning duct 41, a blower 42, an inside/outside air switching door 43, an air mixing door 44, and outlet switching doors 45 to 47.

The air conditioning duct 41 insidely includes an air passageway 410 that introduces conditioning air to the inside of the vehicle. In the air passageway 410, air flows in a direction indicated by an arrow A in the figure. An outside air inlet 411 and an inside air inlet 412 are placed at upstream locations in the airflow direction A of the air conditioning duct 41 for admitting air into the air passageway 410. The outside air inlet 411 admits outside air, which is air located outside the vehicle, into the air passageway 410. The inside air inlet 412 admits inside air, which is air located inside the vehicle, into the air passageway 410. The air conditioning duct 41 accommodates the blower 42, the second inside heat exchanger 26, the heater core 32, and the first inside heat exchanger 22 in the order set forth from the outside air inlet 411 and the inside air inlet 412 toward downstream locations in the airflow direction A.

A defroster outlet 413, a face outlet 414, and a foot outlet 415 are placed at downstream locations in the airflow direction A of the air conditioning duct 41. The defroster outlet 413 emits conditioning air flowing in the air conditioning duct 41 toward a windshield of the vehicle. The face outlet 414 emits conditioning air flowing in the air conditioning duct 41 toward the face of a driver or an occupant in the passenger seat and its nearby area. The foot outlet 415 emits conditioning air flowing in the air conditioning duct 41 toward the feet of the driver or the occupant in the passenger seat and their nearby area.

The blower 42 is in a position downstream of the outside air inlet 411 and the inside air inlet 412 in the airflow direction A. The blower 42 is rotated based on electric power supplied thereto to generate airflow in the air passageway 410 in the direction indicated by the arrow A. The flow rate of air passing through the air passageway 410, in other words, the amount of conditioning air, is regulated by regulating the electric power supplied to the blower 42.

The inside/outside air switching door 43 closes or opens the outside air inlet 411 and the inside air inlet 412. When the inside/outside air switching door 43 is in an inside air introducing position indicated by a solid line in the figure, the outside air inlet 411 is closed and the inside air inlet 412 is open. In this case, the air conditioner 10 is in an inside air circulating mode in which inside air is introduced into the air passageway 410 through the inside air inlet 412. When the inside/outside air switching door 43 is in an outside air introducing position indicated by a broken line in the figure, the inside air inlet 412 is closed and the outside air inlet 411 is open. In this case, the air conditioner 10 is in an outside air introducing mode in which outside air is introduced into the air passageway 410 through the outside air inlet 411.

The air mixing door 44 regulates the ratio between the amount of conditioning air flowing into the heater core 32 and the first inside heat exchanger 22 and the amount of conditioning air bypassing the heater core 32 and the first inside heat exchanger 22. Specifically, the air mixing door 44 can be adjusted between a maximum cooling position indicated by a solid line in the figure and a maximum heating position indicated by a broken line in the figure. When the air mixing door 44 is at the maximum cooling position, most of the conditioning air that has passed through the second inside heat exchanger 26 bypasses the heater core 32 and the first inside heat exchanger 22. Air cooled by the second inside heat exchanger 26 thus flows directly to the outlets 413 to 415, which causes the temperature of the conditioning air to reach the lowest level. When the air mixing door 44 is at the maximum heating position, most of the conditioning air that has passed through the second inside heat exchanger 26 flows through the heater core 32 and the first inside heat exchanger 22, which causes the temperature of the conditioning air to reach the highest level. The air conditioner 10 regulates the temperature of conditioning air by regulating the degree of opening of the air mixing door 44 between the maximum heating position and the maximum cooling position.

The outlet switching doors 45, 46, and 47 switch the defroster outlet 413, the face outlet 414, and the foot outlet 415, respectively, between the open state and the closed state. When at least one of the outlet switching doors 45 to 47 is open, conditioning air is emitted from the open outlet into the inside of the vehicle.

An electrical configuration of the air conditioner 10 is described next.

As illustrated in FIG. 1, the air conditioner 10 includes temperature sensors 60 to 65 and pressure sensors 70 and 71.

The temperature sensor 60 detects temperature Td of refrigerant discharged by the compressor 21. The temperature sensor 61 detects temperature Th of refrigerant that has passed through the first inside heat exchanger 22. The temperature sensor 62 detects temperature Ts of refrigerant that has passed through the outside heat exchanger 24. The temperature sensor 63 detects temperature Tev of refrigerant that has passed through the second inside heat exchanger 26. The temperature sensor 64 detects temperature Tw of coolant discharged by the heater core 32. The temperature sensor 65 detects inflow temperature Tin, which is the temperature of conditioning air flowing into the second inside heat exchanger 26.

The pressure sensor 70 detects pressure Ph of refrigerant that has passed through the first inside heat exchanger 22. The pressure sensor 71 detects pressure Ps of refrigerant that has passed through the outside heat exchanger 24.

Figure 2:
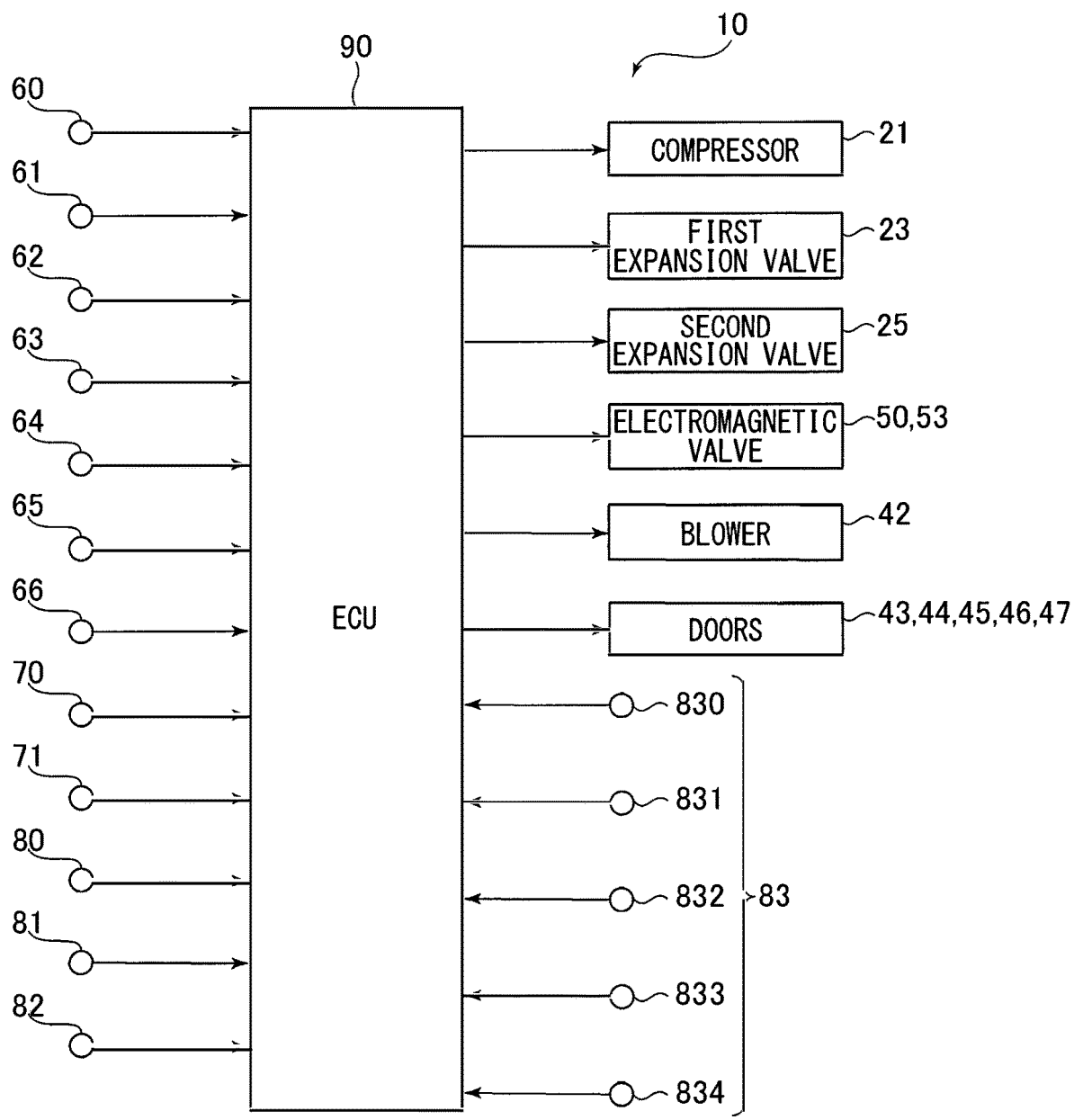
FIG. 2 is a block diagram illustrating an electrical configuration of the vehicular air conditioner according to the first embodiment.

As illustrated in FIG. 2, the air conditioner 10 further includes a temperature sensor 66, an inside air temperature sensor 80, an outside air temperature sensor 81, a solar irradiation sensor 82, an operation device 83, and an ECU (electronic control unit) 90. In the present embodiment, the ECU 90 corresponds to a controller.

The temperature sensor 66 detects outlet temperature Tav, which is the temperature of conditioning air emitted from the air conditioning duct 41 into the inside of the vehicle. The inside air temperature sensor 80 detects inside air temperature Tr, which is the temperature of air located inside the vehicle. The outside air temperature sensor 81 detects outside air temperature Tam, which is the temperature of air located outside the vehicle. The solar irradiation sensor 82 detects solar irradiation Tsr in the inside of the vehicle.

The sensors 60 to 66, 70, 71, and 80 to 82 output signals in accordance with physical quantities respectively detected. Output signals from the sensors 60 to 66, 70, 71, and 80 to 82 are received by the ECU 90.

The operation device 83 is placed, for example, in or near an instrument panel of the vehicle. The operation device 83 includes a temperature setting switch 830, an inside air switch 831, an outside air switch 832, an outlet changeover switch 833, an air control switch 834, and the like. The air control switch 834 may be hereinafter referred to in abbreviated form as "A/C switch 834."

The temperature setting switch 830 is operated to set air conditioning temperature for the inside of the vehicle. The inside air switch 831 is operated to set the air conditioner 10 to the inside air circulating mode. The outside air switch 832 is operated to set the air conditioner 10 to the outside air circulating mode. The outlet changeover switch 833 is operated to select any of the defroster outlet 413, the face outlet 414, and the foot outlet 415 to emit conditioning air. The A/C switch 834 is operated to switch between starting and stopping of cooling or dehumidification of conditioning air. The operation device 83 outputs signals in accordance with operation information of the switches 830 to 834. Output signals from the operation device 83 are received by the ECU 90.

The ECU 90 is configured using a widely known microcomputer, which includes a CPU, a ROM, a RAM, and the like, peripheral circuits, and the like. The ECU 90 controls the compressor 21, the first expansion valve 23, the second expansion valve 25, the electromagnetic valves 50 and 53, the blower 42, the doors 43 to 47, and the like based on output signals from the sensors 60 to 66, 70, 71, and 80 to 82 and the operation device 83.

A procedure for specific processing executed by the ECU 90 is described next with reference to FIG. 3. The ECU 90 executes the processing illustrated in FIG. 3 repeatedly with a predefined cycle.

Figure 3:
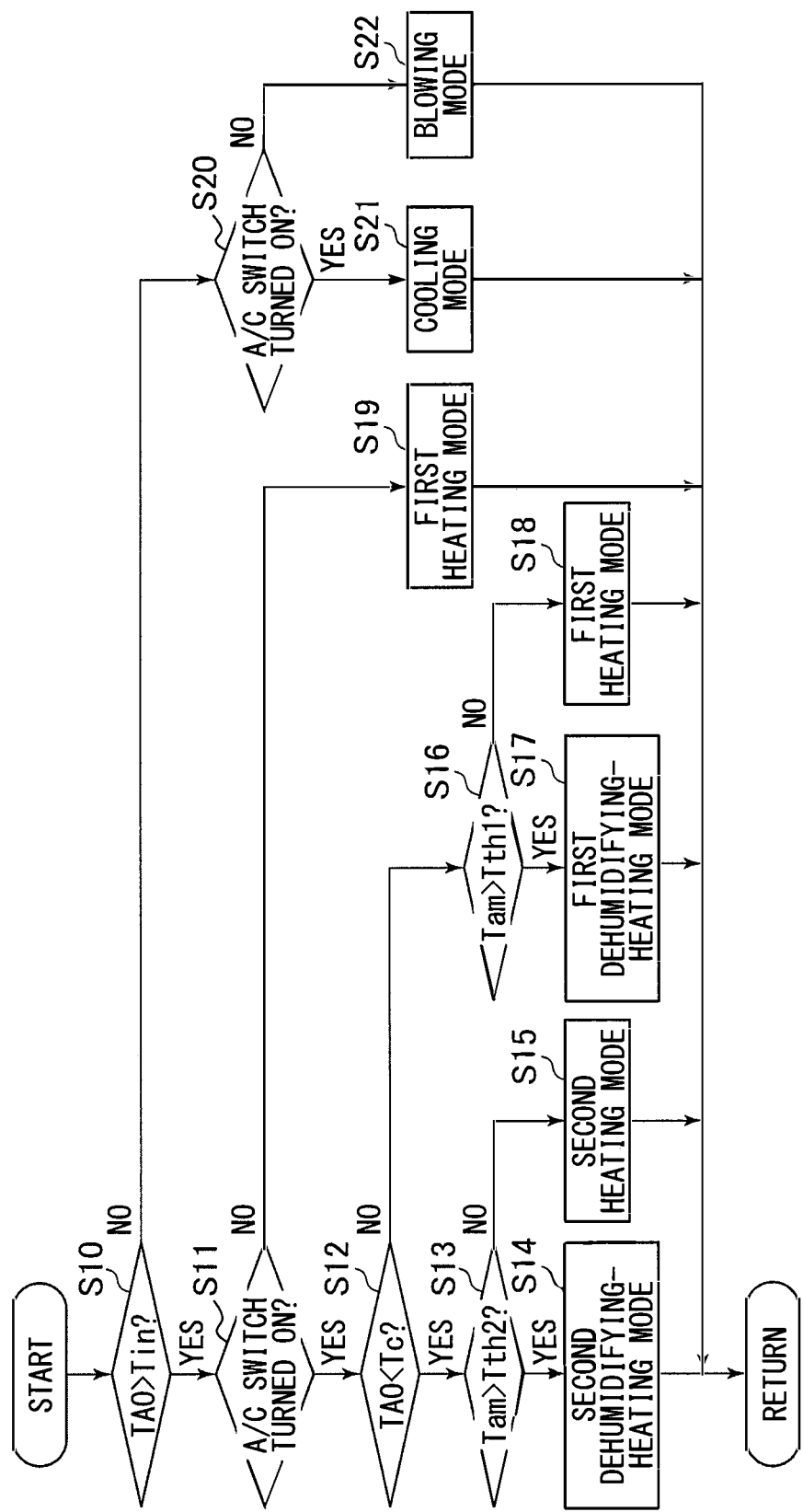
FIG. 3 is a flowchart of a procedure for processing performed by the vehicular air conditioner according to the first embodiment.

As illustrated in FIG. 3, the ECU 90 determines in step S10 whether target outlet temperature TAO is higher than the inflow temperature Tin. The target outlet temperature TAO is a target temperature for conditioning air to be emitted into the inside of the vehicle. Specifically, the ECU 90 calculates the target outlet temperature TAO using a predefined operational expression based on an inside setting temperature set by the temperature setting switch 830, the inside air temperature Tr, the outside air temperature Tam, and the solar irradiation Tsr.

When the determination made in step S10 is in the negative, that is, when the target outlet temperature TAO is equal to or lower than the inflow temperature Tin, the ECU 90 determines in step S20 whether the A/C switch 834 is turned on. When the determination made in step S20 is in the affirmative, that is, when the A/C switch 834 is turned on, the ECU 90 causes the air conditioner 10 to operate in the cooling mode in step S21. The cooling mode is an operation mode in which the inside of the vehicle is cooled using the heat pump cycle unit 20.

When the operation mode of the air conditioner 10 is set to the cooling mode, the ECU 90 causes a refrigerant circuit of the heat pump cycle unit 20 to be a cooling circuit as indicated by arrows in FIG. 1. Specifically, the ECU 90 causes the first expansion valve 23 to be in the fully open state and the second expansion valve 25 to be open to a predefined degree. The ECU 90 also causes the electromagnetic valves 50 and 53 in the closed state. Refrigerant thus flows in the heat pump cycle unit 20 as indicated by the arrows in FIG. 1. That is, refrigerant is discharged by the compressor 21, flows through the first inside heat exchanger 22, the first expansion valve 23, the outside heat exchanger 24, the second expansion valve 25, the second inside heat exchanger 26, the pressure regulating valve 52, and the accumulator 27 in the order set forth, and is re-admitted into the compressor 21.

The ECU 90 also causes the air mixing door 44 to be at the maximum cooling position indicated by the solid line in FIG. 1 when the operation mode of the air conditioner 10 is set to the cooling mode.

The ECU 90 deduces the temperature of conditioning air that has passed the second inside heat exchanger 26 based on the refrigerant temperature Tev detected by the temperature sensor 63 and controls the rotation speed of the compressor 21 such that the deduced temperature of the conditioning air approaches the target outlet temperature TAO. The ECU 90 also controls the degree of opening of the second expansion valve 25 such that the degree of supercooling of refrigerant flowing into the second expansion valve 25 approaches a target degree of supercooling. The target degree of supercooling is defined in advance such that, for example, COP of the second expansion valve 25 approaches the maximum value.

In the cooling mode, conditioning air does not flow through the first inside heat exchanger 22. Thus, refrigerant discharged by the compressor 21, having increased temperature and increased pressure, passes through the first inside heat exchanger 22 without performing heat exchange with conditioning air in the air conditioning duct 41 before flowing into the refrigerant pathway W2. With the first expansion valve 23 in the fully open state, refrigerant passing through the refrigerant pathway W2 fully flows into the outside heat exchanger 24 where the refrigerant performs heat exchange with outside air, dissipating heat. The outside heat exchanger 24 thus serves as a condenser. Refrigerant that has passed through the outside heat exchanger 24 is reduced in pressure by the second expansion valve 25 to become a low-pressure refrigerant. The refrigerant then evaporates in the second inside heat exchanger 26 by absorbing heat from conditioning air in the air conditioning duct 41. Conditioning air in the air conditioning duct is cooled in this manner.

As described above, the outside heat exchanger 24 serves as a condenser and the second inside heat exchanger 26 serves as an evaporator to cool conditioning air in the air conditioning duct 41 in the cooling mode. Conditioning air cooled by the second inside heat exchanger 26 flows to the outlets 413 to 415 without passing through the heater core 32 and the first inside heat exchanger 22. The cooled conditioning air is emitted from the outlets 413 to 415 into the inside of the vehicle to thereby cool the inside of the vehicle.

As illustrated in FIG. 3, when the determination made in step S20 is in the negative, that is, when the A/C switch 834 is turned off, the ECU 90 causes the air conditioner 10 to operate in a blowing mode in step S22.

Specifically, when the operation mode of the air conditioner 10 is set to the blowing mode, the ECU 90 causes the heat pump cycle unit 20 to stop operating. The ECU 90 also causes the air mixing door 44 to be at the maximum cooling position. Air admitted into the air conditioning duct 41 by the blower 42 through the outside air inlet 411 or the inside air inlet 412 is emitted as it is into the inside of the vehicle.

When the determination made in step S10 is in the affirmative, that is, when the target outlet temperature TAO is higher than the inflow temperature Tin, the ECU 90 determines in step S11 whether the A/C switch 834 is turned on. When the determination made in step S11 is in the negative, that is, when the A/C switch 834 is turned off, the ECU 90 causes the air conditioner 10 to operate in a first heating mode in step S19. The first heating mode is an operation mode in which the inside of the vehicle is heated using the heat pump cycle unit 20 and the hot water heating unit 30.

Figure 4:
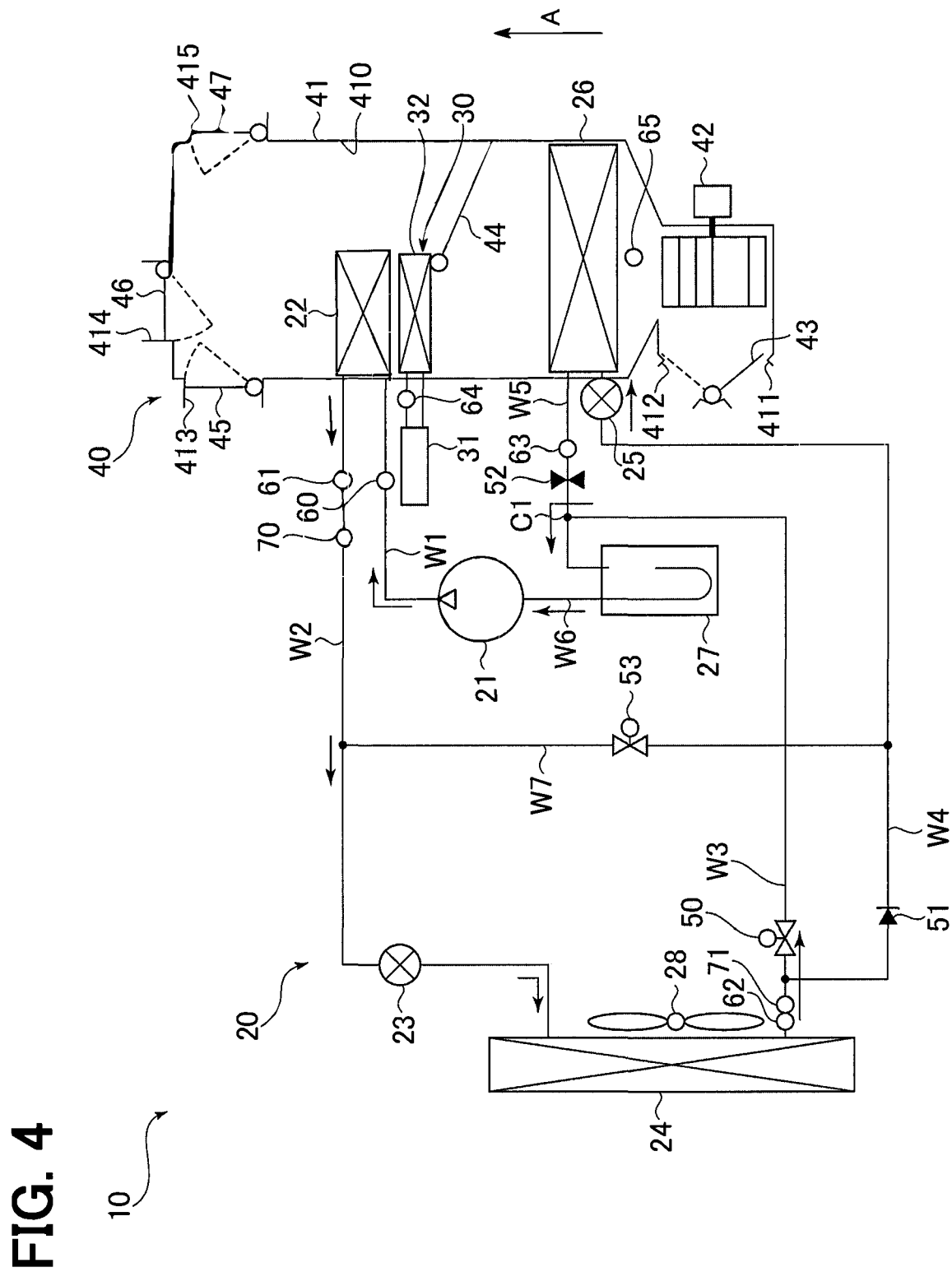
FIG. 4 is a block diagram illustrating an operation example in a first heating mode of the vehicular air conditioner according to the first embodiment.

When the operation mode of the air conditioner 10 is set to the first heating mode, the ECU 90 causes the refrigerant circuit of the heat pump cycle unit 20 to be a heating circuit as indicated by arrows in FIG. 4. Specifically, the ECU 90 causes the first expansion valve 23 to be open to a predefined degree and the second expansion valve 25 to be closed. The ECU 90 also causes the electromagnetic valve 50 to be open and the electromagnetic valve 53 to be closed. Refrigerant thus flows in the heat pump cycle unit 20 as indicated by the arrows in FIG. 4. That is, refrigerant is discharged by the compressor 21, flows through the first inside heat exchanger 22, the first expansion valve 23, the outside heat exchanger 24, and the accumulator 27 in the order set forth, and is re-admitted into the compressor 21.

The ECU 90 also causes the air mixing door 44 to be at the maximum heating position indicated by a solid line in FIG. 4 when the operation mode of the air conditioner 10 is set to the first heating mode.

The ECU 90 also controls the rotation speed of the compressor 21 such that the outlet temperature Tav detected by the temperature sensor 66 reaches the target outlet temperature TAO. The ECU 90 also controls the degree of opening of the first expansion valve 23 such that the degree of supercooling of refrigerant flowing into the first expansion valve 23 approaches a target degree of supercooling. The target degree of supercooling is defined in advance such that, for example, COP of the first expansion valve 23 approaches the maximum value.

In the first heating mode, refrigerant discharged by the compressor 21, having increased temperature and increased pressure, flows through the first inside heat exchanger 22, dissipating heat to conditioning air in the air conditioning duct 41. The first inside heat exchanger 22 thus serves as a condenser. Conditioning air in the air conditioning duct 41 is heated in this manner. Refrigerant that has passed through the first inside heat exchanger 22 is reduced in pressure by the first expansion valve 23 to become a low-pressure refrigerant. The refrigerant then absorbs heat from the outside air by heat exchange in the outside heat exchanger 24. The outside heat exchanger 24 thus serves as an evaporator.

As described above, the first inside heat exchanger 22 serves as a condenser and the outside heat exchanger 24 serves as an evaporator. Conditioning air in the air conditioning duct 41 is thus heated by at least one of the first inside heat exchanger 22 and the heater core 32 in the first heating mode. The conditioning air heated by at least one of the first inside heat exchanger 22 and the heater core 32 is emitted from the outlets 413 to 415 into the inside of the vehicle to thereby heat the inside of the vehicle.

As illustrated in FIG. 3, when the determination made in step S11 is in the affirmative, that is, when the A/C switch 834 is turned on, the ECU 90 determines in step S12 whether passage air temperature Tc is higher than the target outlet temperature TAO. The passage air temperature Tc is the temperature of conditioning air that has passed through the heater core 32. The ECU 90 can deduce the passage air temperature Tc based on, for example, the temperature Tw of coolant detected by the temperature sensor 64. In the present embodiment, the temperature sensor 64 and the ECU 90 thus correspond to a temperature detector that detects the passage air temperature Tc.

When the determination made in step S12 is in the negative, that is, when the passage air temperature Tc is equal to or lower than the target outlet temperature TAO, the ECU 90 determines that the outlet temperature Tav of conditioning air is unlikely to be raised by the heat of the heater core 32 to the target outlet temperature TAO. The ECU 90 then determines in step S16 whether the outside air temperature Tam is higher than a first temperature threshold value Tth1. The first temperature threshold value Tth1 is determined in advance by an experiment or the like such that the value enables determination whether the outside air temperature Tam allows the heat pump cycle unit 20 to dehumidify conditioning air. The first temperature threshold value Tth1 is set to, for example, 0° C. When the determination made in step S16 is in the negative, that is, when the outside air temperature Tam is equal to or lower than the first temperature threshold value Tth1, the ECU 90 determines that conditioning air cannot be dehumidified using the heat pump cycle unit 20. The ECU 90 then causes, in step S18, the air conditioner 10 to operate in the first heating mode as in step S19.

When the determination made in step S16 is in the affirmative, that is, when the outside air temperature Tam is higher than the first temperature threshold value Tth1, the ECU 90 causes the air conditioner 10 to operate in a first dehumidifying-heating mode in step S17. The first dehumidifying-heating mode is an operation mode that heats the inside of the vehicle while dehumidifying it. The first dehumidifying-heating mode includes a series dehumidifying-heating mode, which is performed under normal circumstances, and a parallel dehumidifying-heating mode, which is performed when the outside air temperature Tam is low.

Figure 5:
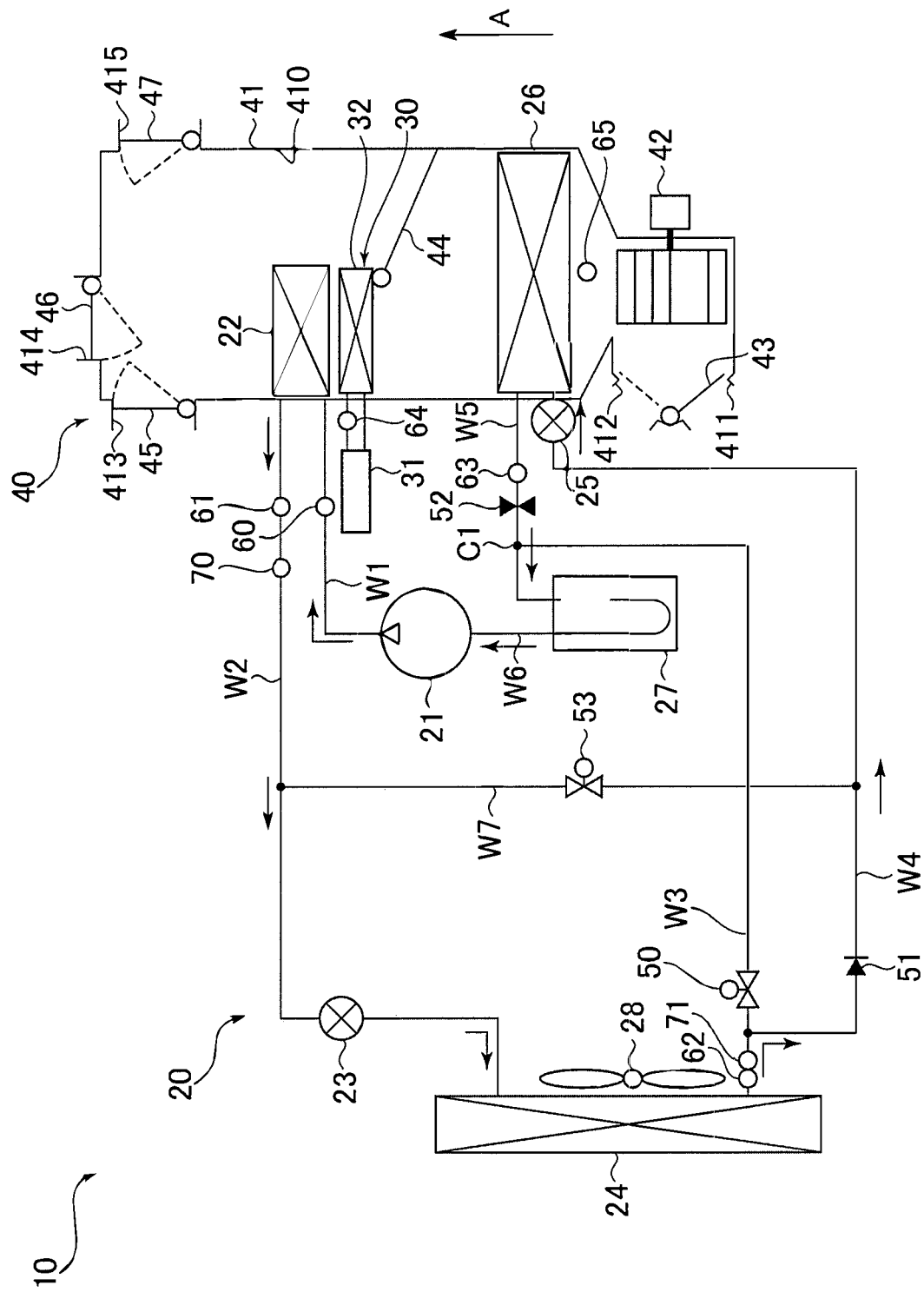
FIG. 5 is a block diagram illustrating an operation example in a series dehumidifying-heating mode of the vehicular air conditioner according to the first embodiment.

When the operation mode of the air conditioner 10 is set to the series dehumidifying-heating mode, the ECU 90 causes the refrigerant circuit of the heat pump cycle unit 20 to be a series dehumidifying-heating circuit as indicated by arrows in FIG. 5. Specifically, the ECU 90 causes the first expansion valve 23 and the second expansion valve 25 to be open to predefined degrees. The ECU 90 also causes the electromagnetic valves 50 and 53 in the closed state. Refrigerant thus flows in the heat pump cycle unit 20 as indicated by the arrows in FIG. 5. That is, the outside heat exchanger 24 is connected in series with the second inside heat exchanger 26 with respect to the flow of refrigerant in the series dehumidifying-heating circuit.

The ECU 90 also causes the air mixing door 44 to be at the maximum heating position indicated in the figure when the operation mode of the air conditioner 10 is set to the series dehumidifying-heating mode.

The ECU 90 also controls the degrees of opening of the first expansion valve 23 and the second expansion valve 25 in accordance with the target outlet temperature TAO. Specifically, the ECU 90 varies the degree of opening of the first expansion valve 23 in a valve closing direction and that of the second expansion valve 25 in a valve opening direction with the target outlet temperature TAO increasing. As a result, the sectional area of pathway in the refrigerant pathway W2 decreases and the sectional area of pathway in the second expansion valve 25 increases with the target outlet temperature TAO increasing.

In the series dehumidifying-heating mode, refrigerant discharged by the compressor 21, having increased temperature and increased pressure, flows through the first inside heat exchanger 22, dissipating heat to conditioning air in the air conditioning duct 41. The first inside heat exchanger 22 thus serves as a condenser. Conditioning air in the air conditioning duct 41 is heated in this manner. Refrigerant that has passed through the first inside heat exchanger 22 flows through the first expansion valve 23 into the outside heat exchanger 24. In accordance with the degree of opening of the first expansion valve 23 at this time, the outside heat exchanger 24 thus serves as a condenser or evaporator. The series dehumidifying-heating mode includes, for example, a first mode and a second mode described below in accordance with the degrees of opening of the first expansion valve 23 and the second expansion valve 25.

(A) First Mode

The first mode is performed when the target outlet temperature TAO is equal to or lower than a predefined reference temperature. In the first mode, the first expansion valve 23 is caused to be open to a predefined degree that is near the fully open state. The second expansion valve 25 is placed in a reduced state.

In the first mode, refrigerant that has passed through the first inside heat exchanger 22 is reduced in pressure by the first expansion valve 23 to become an intermediate-pressure refrigerant. The refrigerant then flows to the outside heat exchanger 24. Refrigerant that has flown into the outside heat exchanger 24 dissipates heat by heat exchange with outside air while in the outside heat exchanger 24. The outside heat exchanger 24 thus serves as a condenser. Refrigerant that has passed through the outside heat exchanger 24 is reduced in pressure by the second expansion valve 25 to become a low-pressure refrigerant. The refrigerant then evaporates in the second inside heat exchanger 26 by absorbing heat from conditioning air in the air conditioning duct 41. Conditioning air in the air conditioning duct is cooled in this manner.

As described above, conditioning air cooled and dehumidified by the second inside heat exchanger 26 can be heated by the first inside heat exchanger 22 and the heater core 32 and emitted into the inside of the vehicle. Thus, the inside of the vehicle can be heated while dehumidified in the first mode.

(B) Second Mode

The second mode is performed when the target outlet temperature TAO is higher than the predefined reference temperature. In the second mode, the first expansion valve 23 is caused to be open to a predefined degree that is further into the valve closing direction than that of the first mode. The second expansion valve 25 is caused to be open to a degree that is further into the valve opening direction than that of the first mode.

In the second mode, refrigerant that has passed through the first inside heat exchanger 22 is reduced in pressure by the first expansion valve 23 to become an intermediate-pressure refrigerant having a temperature lower than the outside air temperature Tam. The refrigerant then flows to the outside heat exchanger 24. Refrigerant that has flown into the outside heat exchanger 24 absorbs heat by heat exchange with outside air in the outside heat exchanger 24. The outside heat exchanger 24 thus serves as an evaporator. Refrigerant that has passed through the outside heat exchanger 24 is reduced in pressure by the second expansion valve 25 to become a low-pressure refrigerant. The refrigerant then evaporates in the second inside heat exchanger 26 by absorbing heat from conditioning air in the air conditioning duct 41. Conditioning air in the air conditioning duct is cooled in this manner.

As described above, conditioning air cooled and dehumidified by the second inside heat exchanger 26 can be heated by the first inside heat exchanger 22 and the heater core 32 and emitted into the inside of the vehicle. Thus, the inside of the vehicle can be heated while dehumidified also in the second mode.

Furthermore, the outside heat exchanger 24 serves as an evaporator, i.e., as a heat absorber, in the second mode. The amount of heat dissipation from refrigerant in the first inside heat exchanger 22 can be thus greater than that in the second mode. As a result, the temperature of conditioning air can be increased to be higher than that in the second mode.

Figure 6:
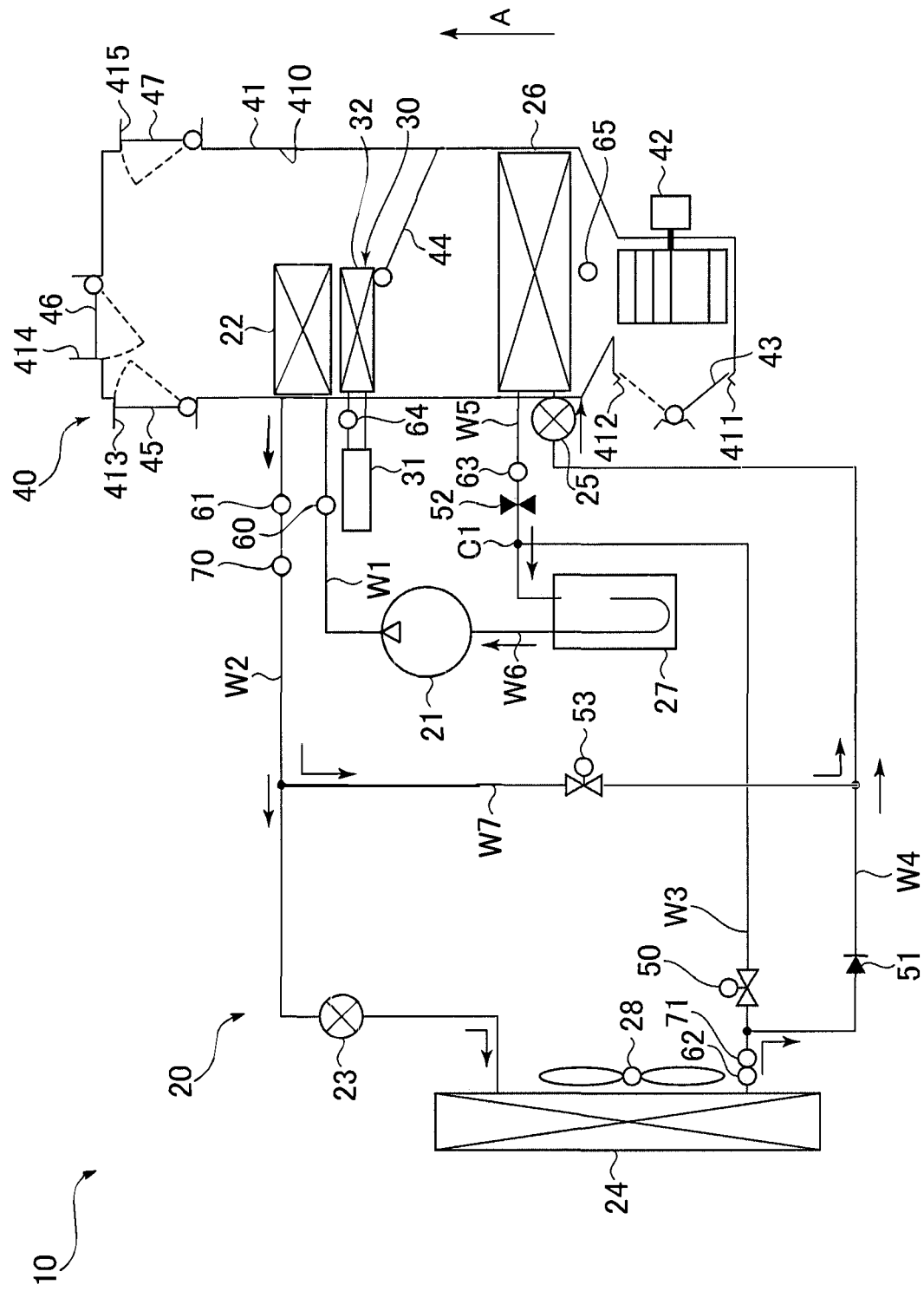
FIG. 6 is a block diagram illustrating an operation example in a parallel dehumidifying-heating mode of the vehicular air conditioner according to the first embodiment.

When the operation mode of the air conditioner 10 is set to the parallel dehumidifying-heating mode, the ECU 90 causes the refrigerant circuit of the heat pump cycle unit 20 to be a parallel dehumidifying-heating circuit as indicated by arrows in FIG. 6. Specifically, the ECU 90 causes the first expansion valve 23 and the second expansion valve 25 to be open to predefined degrees. The ECU 90 also causes the electromagnetic valve 50 in the closed state and the electromagnetic valve 53 to be open. Refrigerant thus flows in the heat pump cycle unit 20 as indicated by the solid line in FIG. 6. That is, the outside heat exchanger 24 is connected in parallel with the second inside heat exchanger 26 with respect to the flow of refrigerant in the parallel dehumidifying-heating circuit.

The ECU 90 also causes the air mixing door 44 to be at the maximum heating position indicated in the figure. The ECU 90 also causes the first expansion valve 23 and the second expansion valve 25 to be open to the predefined degrees.

Thus, in the parallel dehumidifying-heating mode, refrigerant discharged by the compressor 21, having increased temperature and increased pressure, flows through the first inside heat exchanger 22, dissipating heat to conditioning air in the air conditioning duct 41. The first inside heat exchanger 22 thus serves as a condenser. Conditioning air in the air conditioning duct 41 is heated in this manner. Refrigerant that has passed through the first inside heat exchanger 22 either flows to the first expansion valve 23 or flows through the bypass W7 to the second expansion valve 25. Refrigerant flowing through the first expansion valve 23 is reduced in pressure to become a low-pressure refrigerant. The refrigerant then flows through the outside heat exchanger 24, absorbing heat from outside air by heat exchange with the outside air.

Refrigerant flowing through the second expansion valve 25 is reduced in pressure to become a low-pressure refrigerant. The refrigerant having a pressure lowered by the second expansion valve 25 evaporates in the second inside heat exchanger 26 by absorbing heat from conditioning air in the air conditioning duct 41. Conditioning air in the air conditioning duct is cooled in this manner.

As described above, the outside heat exchanger 24 is connected in parallel with the second inside heat exchanger 26 with respect to the flow of refrigerant in the parallel dehumidifying-heating mode. The amount of refrigerant flowing into the second inside heat exchanger 26 can be thus smaller than that of the series dehumidifying-heating mode. Accordingly, the amount of heat absorbed by refrigerant in the second inside heat exchanger 26 can be reduced. Thus, the temperature of conditioning air can be regulated by the first inside heat exchanger 22 in a temperature range higher than that of the series dehumidifying-heating mode.

As illustrated in FIG. 3, when the determination made in step S12 is in the affirmative, that is, when the passage air temperature Tc is higher than the target outlet temperature TAO, the ECU 90 determines that the temperature of conditioning air can be raised by heat of the heater core 32. The ECU 90 then determines in step S13 whether the outside air temperature Tam is higher than a second temperature threshold value Tth2. The second temperature threshold value Tth2 is a value smaller than the first temperature threshold value Tth1. The second temperature threshold value Tth2 is set as described below, for example.

When the outside air temperature Tam decreases, the temperature of refrigerant also decreases. The second inside heat exchanger 26 then tends not to work as an evaporator. The outside air temperature Tam that allows the second inside heat exchanger 26 of the heat pump cycle unit 20 to perform dehumidification has a lower limit value. When refrigerant decreases in temperature with the outside air temperature Tam decreasing, refrigerant in the liquid phase is likely to flow into the compressor 21. Thus, the outside air temperature Tam that can maintain the operation of the compressor 21 while avoiding damage due to liquid compression also has a lower limit value. In the present embodiment, the lower limit value of the outside air temperature Tam that allows the second inside heat exchanger 26 of the heat pump cycle unit 20 to perform dehumidification and the lower limit value of the outside air temperature Tam that can maintain the operation of the compressor 21 are obtained by an experiment or the like, and the smaller of the two lower limit values is set as the second temperature threshold value Tth2.

When the determination made in step S13 is in the affirmative, that is, when the outside air temperature Tam is higher than the second temperature threshold value Tth2, the ECU 90 causes the air conditioner 10 to operate in a second dehumidifying-heating mode in step S14. The second dehumidifying-heating mode is an operation mode in which the inside of the vehicle is heated by using the hot water heating unit 30 while the inside of the vehicle is dehumidified by operating the heat pump cycle unit 20 in the cooling circuit.

When the operation mode of the air conditioner 10 is set to the second dehumidifying-heating mode, the ECU 90 causes the refrigerant circuit of the heat pump cycle unit 20 to be the refrigerant circuit as indicated by arrows in FIG. 1. Specifically, the ECU 90 causes the first expansion valve 23 to be in the fully open state and the second expansion valve 25 to be open to a predefined degree. The ECU 90 also causes the electromagnetic valves 50 and 53 in the closed state. Refrigerant thus flows in the heat pump cycle unit 20 as indicated by the arrows in FIG. 1. That is, refrigerant is discharged by the compressor 21, flows through the first inside heat exchanger 22, the first expansion valve 23, the outside heat exchanger 24, the second expansion valve 25, the second inside heat exchanger 26, the pressure regulating valve 52, and the accumulator 27 in the order set forth, and is re-admitted into the compressor 21.

The ECU 90 also causes the air mixing door 44 to be at a position within a temperature regulation region when the operation mode of the air conditioner 10 is set to the second dehumidifying-heating mode. A position within the temperature regulation region refers to any position between the maximum heating position and the maximum cooling position.

Thus, in the second dehumidifying-heating mode, conditioning air in the air conditioning duct 41 is dehumidified by the second inside heat exchanger 26 and heated by the first inside heat exchanger 22 and the heater core 32. Conditioning air dehumidified and heated can be thus emitted into the inside of the vehicle, enabling dehumidification and heating of the inside of the vehicle.

As illustrated in FIG. 3, when the determination made in step S13 is in the negative, that is, when the outside air temperature Tam is equal to or lower than the second temperature threshold value Tth2, the ECU 90 causes the air conditioner 10 to operate in a second heating mode in step S15. When the operation mode of the air conditioner 10 is set to the second heating mode, the ECU 90 causes the heat pump cycle unit 20 to stop operating. The ECU 90 also causes the air mixing door 44 to be at a position within the temperature regulation region. Conditioning air flowing in the air conditioning duct 41 is thus heated while passing through the heater core 32. The heated conditioning air is then emitted into the inside of the vehicle, heating the inside of the vehicle.

In the present embodiment, processing in steps S16 to S18, which may be performed by the ECU 90 when the determination made in step S12 is in the negative, corresponds to first processing. Also, processing in steps S13 to S15, which may be performed by the ECU 90 when the determination made in step S12 is in the affirmative, corresponds to second processing.

As described above, the ECU 90 in the present embodiment selectively switches the refrigerant circuit of the heat pump cycle unit 20 to any of the cooling circuit, the heating circuit, and the dehumidifying-heating circuits based on the passage air temperature Tc, which is the temperature of conditioning air that has passed through the heater core 32. When the passage air temperature Tc is equal to or lower than the target outlet temperature TAO, that is, when the temperature of conditioning air is unlikely to be raised by the heater core 32, the heat pump cycle unit 20 can be operated in one of the dehumidifying-heating circuits to thereby enable dehumidification and heating of the conditioning air. When the outside air temperature Tam is equal to or lower than the first temperature threshold value Tth1, that is, when conditioning air is unlikely to be dehumidified, the heat pump cycle unit 20 is operated in the heating circuit to thereby enable at least heating of the conditioning air.

When the passage air temperature Tc is higher than the target outlet temperature TAO, that is, when the temperature of conditioning air can be raised by the heater core 32, the heat pump cycle unit 20 is operated in the cooling circuit. Thus, both dehumidification and heating of the conditioning air can be satisfied. When the heat pump cycle unit 20 is operated in the cooling circuit, a secondary effect is produced where conditioning air can be dehumidified even when the outside air temperature Tam is in a region of the second temperature threshold value Tth2, which is lower than the first temperature threshold value Tth1. As a result, the region of the outside air temperature Tam that can be dehumidified is enlarged.

Accordingly, when the passage air temperature detected by the temperature detector is equal to or lower than the target outlet temperature, that is, when the temperature of the conditioning air is unlikely to be raised by the heater core 32, the heat pump cycle unit 20 is operated in the dehumidifying-heating circuit. Thus, both dehumidification and heating of the conditioning air can be satisfied. When conditioning air is unlikely to be dehumidified, the heat pump cycle unit 20 is operated in the heating circuit to thereby enable at least heating of the conditioning air.

In contrast, when the passage air temperature detected by the temperature detector is higher than the target outlet temperature, that is, when the temperature of conditioning air can be raised by the heater core 32, the heat pump cycle unit 20 is operated in the cooling circuit. Thus, both dehumidification and heating of the conditioning air can be satisfied. When the heat pump cycle unit 20 is operated in the cooling circuit, a secondary effect is produced where conditioning air can be dehumidified even when the vehicle outside air temperature is lower. As a result, the region of the outside air temperature that can be dehumidified is enlarged.

Second Embodiment

A vehicular air conditioner 10 according to a second embodiment is described next. Difference from the vehicular air conditioner 10 according to the first embodiment is mainly described.

The drive mode of a vehicle in the present embodiment can be set to an HV mode and an EV mode by the operation of the driver. In the HV mode, the vehicle is driven mainly using power from an engine 31. In the EV mode, the vehicle is driven mainly using power from an electric motor.

In the vehicle as described above, the passage air temperature Tc, which is the temperature of conditioning air that has passed through a heater core 32, can be higher than the target outlet temperature TAO in the HV mode because the engine 31 is operated. That is, an ECU 90 can make the affirmative determination in step S12 in FIG. 3. There is thus a possibility that the air conditioner 10 will be operated in the second dehumidifying-heating mode.

When the air conditioner 10 starts operating in the second dehumidifying-heating mode and then the drive mode of the vehicle is switched from the HV mode to the EV mode where the engine 31 stops operating, the temperature of the heater core 32 decreases gradually. In the meantime, water may be retained on an outer surface of the second inside heat exchanger 26, which is working as an evaporator, because a heat pump cycle unit 20 is operating in the refrigerant circuit.

When the passage air temperature Tc then decreases to be equal to or lower than the target outlet temperature TAO with the temperature of the heater core 32 decreasing, the ECU 90 may make the negative determination in step S12 and perform processing of step S18 where the air conditioner 10 is operated in the first heating mode. When the air conditioner 10 is operated in the first heating mode, the heat pump cycle unit 20 is operated in the heating circuit illustrated in FIG. 4. The second inside heat exchanger 26 thus stops working as an evaporator, potentially resulting in the water retained on the second inside heat exchanger 26 evaporating and mixing with conditioning air. Unpleasant smell of the conditioning air and fogging of a windowpane in the inside of the vehicle may result.

Figure 7:
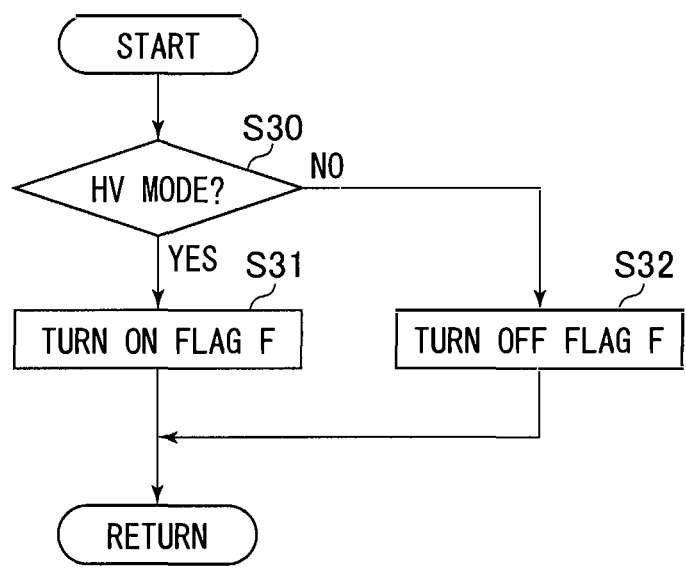
FIG. 7 is a flowchart of a procedure for processing for setting a flag F performed by a vehicular air conditioner according to a second embodiment.
Figure 8:
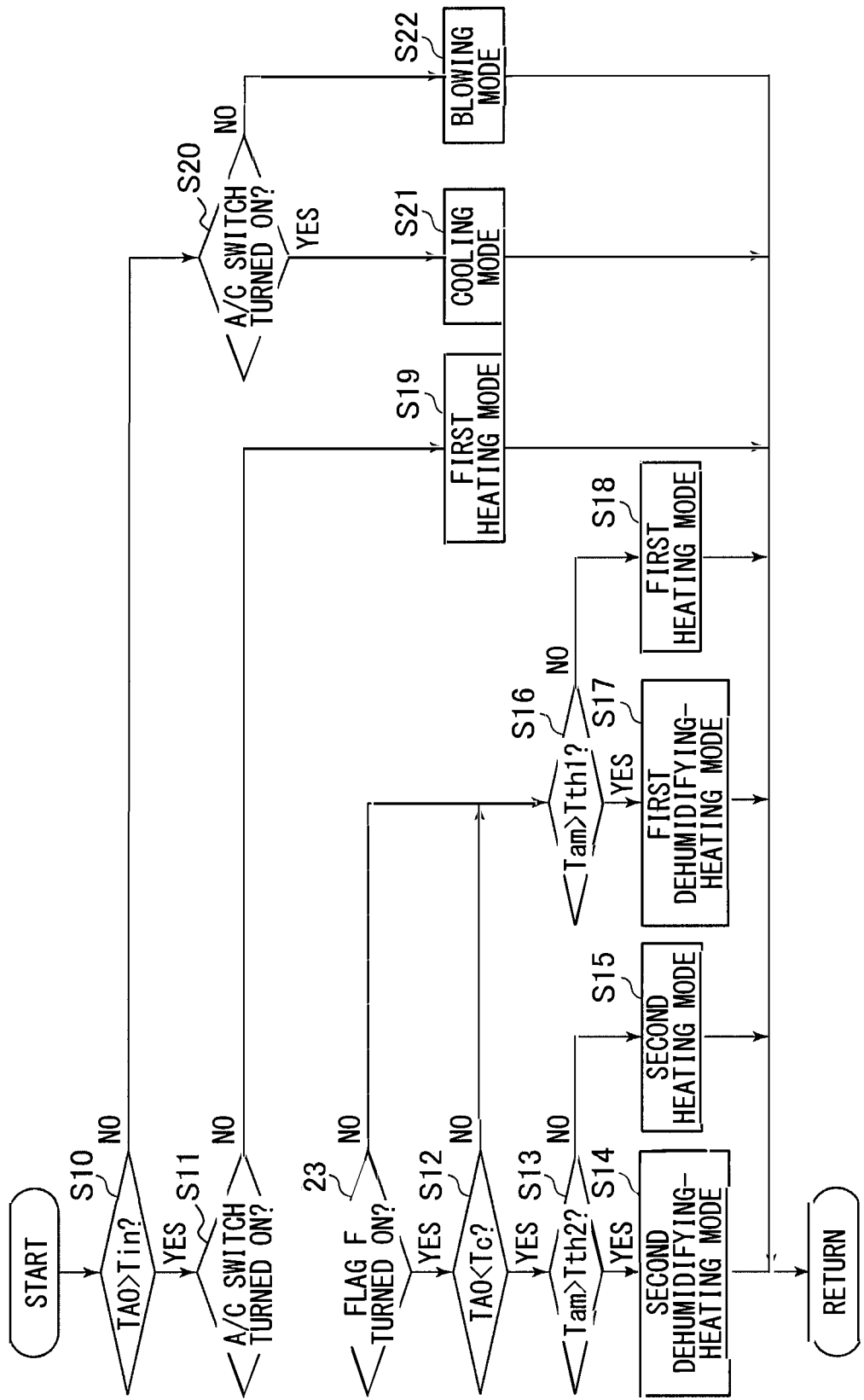
FIG. 8 is a flowchart of a procedure for processing performed by the vehicular air conditioner according to the second embodiment.

The ECU 90 according to the present embodiment thus performs processing illustrated in FIGS. 7 and 8. As illustrated in FIG. 7, the ECU 90 determines in step S30 whether the drive mode of the vehicle is the HV mode. When the determination made in step S30 is in the affirmative, that is, when the drive mode of the vehicle is the HV mode, the ECU 90 turns on a flag F in step S31. When the determination made in step S30 is in the negative, that is, when the drive mode of the vehicle is the EV mode, the ECU 90 turns off the flag F in step S32. The ECU 90 finishes the processing after completing steps S31 or S32. The ECU 90 executes the processing illustrated in FIG. 7 repeatedly with a predefined cycle.

As illustrated in FIG. 8, when the determination made in step S11 is in the affirmative, that is, when the A/C switch 834 is turned on, the ECU 90 determines in step S23 whether the flag F is turned on. When the determination made in step S23 is in the affirmative, that is, when the flag F is turned on, the ECU 90 permits the processing in step S12 and the second processing in steps S13 to S15 as well as the first processing in steps S16 to S18. When the determination made in step S23 is in the negative, that is, when the flag F is turned off, the ECU 90 permits the first processing in steps S16 to S18 only.

When the drive mode of the vehicle is switched from the HV mode to the EV mode, the vehicular air conditioner 10 according to the present embodiment described above immediately performs the first processing in steps S16 to S18. Thus, for example, even when the vehicle is in the HV mode and the heat pump cycle unit 20 is operated in the cooling circuit with the outside air temperature Tam being a value in a range from the first temperature threshold value Tth1 to the second temperature threshold value Tth2, the heat pump cycle unit 20 starts operating in the heating circuit immediately when the drive mode of the vehicle is switched to the EV mode. In this manner, a situation can be avoided where the heat pump cycle unit 20 continues operating in the cooling circuit, resulting in water retained on the second inside heat exchanger 26. Thus, unpleasant smell of conditioning air and fogging of a windowpane in the inside of the vehicle can be inhibited.

Alternatively, the ECU 90 may determine whether the drive mode of the vehicle is the HV mode or the EV mode when the air conditioner 10 is started. The ECU 90 may then retain the determination result until the vehicle stops.

Figure 9:
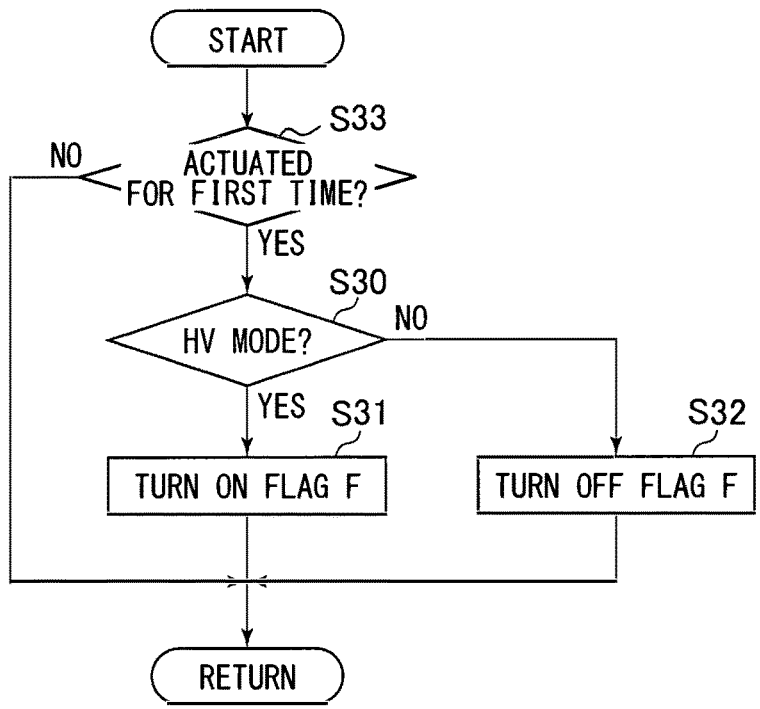
FIG. 9 is a flowchart of a procedure for processing for setting the flag F performed by the vehicular air conditioner according to the second embodiment.

Specifically, as illustrated in FIG. 9, the ECU 90 may determine in step S33 whether the air conditioner 10 is started for the first time after the start of the engine 31. When the determination in step S33 is in the affirmative, the ECU 90 may perform steps S30 to S32.

In the manner described above, a situation can be avoided where the refrigerant circuit of the heat pump cycle unit 20 is switched from the cooling circuit to the heating circuit when the drive mode is switched. Thus, unpleasant smell of conditioning air and fogging of a windowpane in the inside of the vehicle can be avoided more accurately.

Third Embodiment

A vehicular air conditioner 10 according to a third embodiment is described next. Difference from the vehicular air conditioner 10 according to the second embodiment is mainly described.

When the defroster outlet 413 is being selected as an outlet for conditioning air, it is likely that an occupant of the vehicle wishes to give priority to dehumidification of the inside of the vehicle. When the ECU 90 executes processing in FIGS. 7 and 8 in such circumstances, convenience of the occupant may degrade because the air conditioner 10 is immediately switched to the heating mode when the drive mode of the vehicle is switched to the EV mode, thus unable to dehumidify the inside of the vehicle.

Figure 10:
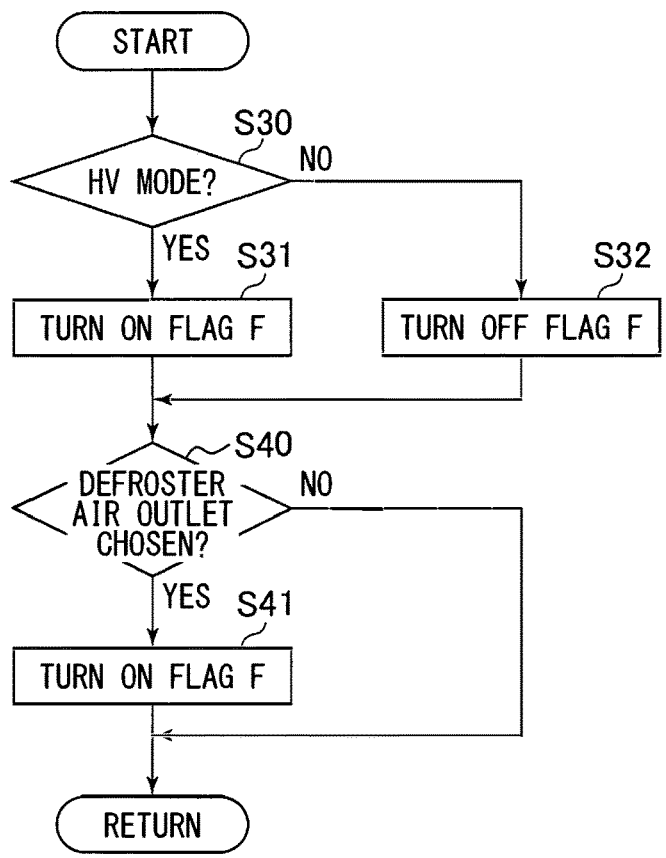
FIG. 10 is a flowchart of a procedure for processing for setting a flag F performed by a vehicular air conditioner according to a third embodiment.

As illustrated in FIG. 10, an ECU 90 according to the present embodiment thus performs processing in steps S31 or S32 and then determines in step S30 whether a defroster outlet 413 is selected as an outlet for conditioning air. When the determination made in step S90 is in the affirmative, that is, when the defroster outlet 413 is selected as an outlet for conditioning air, the ECU 90 turns on the flag F.

In the manner described above, the first processing in steps S16 to S18 and the second processing in steps S13 to S15 as well as the processing in step S12 illustrated in FIG. 8 are permitted when the defroster outlet 413 is selected as an outlet for conditioning air. In other words, restriction on processing based on the drive mode is cancelled. Step S14 or S17 is performed in this manner, dehumidifying conditioning air more reliably and thereby improving convenience of the occupant.

OTHER EMBODIMENTS

The embodiments described above can be also implemented in the following forms.

Processing of the third embodiment illustrated in FIG. 10 can be applied to the processing of the second embodiment illustrated in FIG. 9.

Means and/or functions provided by the ECU 90 can be provided by software recorded in a substantive storage device and a computer that executes the software, software only, hardware only, or some combination of them. For example, when an electronic circuit, which is hardware, serves as the ECU 90, the electronic circuit can be a digital circuit that includes many logic circuits, or an analog circuit.

The present disclosure is not limited to the specific examples described above. Any of the specific examples with added design change made by persons skilled in the art is also included in the scope of the present disclosure as long as it has features of the present disclosure. Each element and its placement, condition, shape, and the like of the specific examples described above are not limited to how they are described herein and can be changed as appropriate. The combinations of the elements in each of the specific examples described above can be changed as appropriate, as long as it is not technically contradictory.

What is claimed is:

1. A vehicular air conditioner, comprising:
an air conditioning duct through which conditioning air for a passenger compartment of a vehicle flows;
a heater core disposed in the air conditioning duct, coolant for cooling an engine of the vehicle flowing through the heater core;
a heat pump cycle unit including
    a first inside heat exchanger disposed downstream of the heater core in a flow direction of the conditioning air, the first inside heat exchanger being configured to exchange heat between the conditioning air and a refrigerant,
    a second inside heat exchanger disposed upstream of the heater core in the flow direction of the conditioning air, the second inside heat exchanger being configured to exchange heat between the conditioning air and the refrigerant, and
    an outside heat exchanger configured to exchange heat between air outside the vehicle and the refrigerant;
a temperature detector configured to detect a passage air temperature, the passage air temperature being a temperature of the conditioning air that has passed through the heater core;
a controller configured to control the heat pump cycle unit; and
an outside air temperature sensor configured to detect an outside air temperature that is a temperature outside the vehicle, wherein
the controller is configured to:
    selectively switch a circuit layout of the heat pump cycle unit between a cooling circuit, a heating circuit, and a dehumidifying-heating circuit based on the passage air temperature;
    switch the layout of the heat pump cycle unit to the cooling circuit by allowing the refrigerant to flow through the first inside heat exchanger, the second inside heat exchanger serving as an evaporator, and the outside heat exchanger serving as a condenser;
    switch the layout of the heat pump cycle unit to the heating circuit by allowing the refrigerant to flow through the first inside heat exchanger serving as a condenser, and the outside heat exchanger serving as an evaporator;
    switch the layout of the heat pump cycle unit to the dehumidifying-heating circuit by allowing the refrigerant to flow through the first inside heat exchanger serving as a condenser, the second inside heat exchanger serving as an evaporator, and the outside heat exchanger;
    control the heat pump cycle unit such that an outlet temperature of the conditioning air to be blown into the passenger compartment reaches a target outlet temperature;
    execute a first processing, when the passage air temperature is equal to or less than the target outlet temperature, by
        (i) switching the layout of the heat pump cycle unit to the dehumidifying-heating circuit when the outside air temperature is higher than a first temperature threshold value, and
        (ii) switching the layout of the heat pump cycle unit to the heating circuit when the outside air temperature is equal to or less than the first temperature threshold value; and
    execute a second processing, when the passage air temperature is higher than the target outlet temperature, by switching the layout of the heat pump cycle unit to the cooling circuit when the outside air temperature is higher than a second temperature threshold value, wherein
the second temperature threshold value is less than the first temperature threshold value, and
the vehicle has a drive mode selectively settable to an HV mode and an EV mode, the vehicle being driven by power from the engine in the HV mode, the vehicle being driven by power from an electric motor in the EV mode.

2. The vehicular air conditioner according to claim 1, wherein
the controller is configured to:
    execute only the first processing when the drive mode of the vehicle is the EV mode; and
    execute the first processing and the second processing when the drive mode of the vehicle is the HV mode.

3. The vehicular air conditioner according to claim 2, wherein
the controller is configured to determine whether the drive mode of the vehicle is the EV mode or the HV mode when the controller is started, and retains a result of the determination until the vehicle stops.

4. The vehicular air conditioner according to claim 1, wherein the controller is configured to execute the first processing and the second processing regardless of the drive mode of the vehicle when the conditioning air is blown from a defroster outlet of the vehicle.

* * * * *